(12) United States Patent
Schrock

(10) Patent No.: US 8,309,852 B2
(45) Date of Patent: Nov. 13, 2012

(54) DUAL ACTING STRAIN RELIEF APPARATUS

(75) Inventor: Kevin Schrock, Sarasota, FL (US)

(73) Assignee: Honeywell International Inc., Morristown, NJ (US)

( * ) Notice: Subject to any disclaimer, the term of this patent is extended or adjusted under 35 U.S.C. 154(b) by 334 days.

(21) Appl. No.: 12/711,459

(22) Filed: Feb. 24, 2010

(65) Prior Publication Data

US 2011/0203832 A1 Aug. 25, 2011

(51) Int. Cl.
*H01B 7/24* (2006.01)

(52) U.S. Cl. ......... 174/136; 174/135; 174/72 A; 174/41; 174/42; 174/146; 174/154; 174/65 R; 439/585; 439/527; 439/574; 439/575; 439/449

(58) Field of Classification Search .................. 174/135, 174/136, 72 A, 41, 42, 146, 154, 65 R; 439/585, 439/527, 574, 575, 449
See application file for complete search history.

(56) References Cited

U.S. PATENT DOCUMENTS

| | | | |
|---|---|---|---|
| 2,362,124 A * | 11/1944 | Ellinwood | 174/135 |
| 4,000,875 A | 1/1977 | Jemison et al. | |
| 4,723,053 A * | 2/1988 | Amaya | 174/41 |
| 5,061,892 A | 10/1991 | O'Hara et al. | |
| 5,102,351 A | 4/1992 | Meshel | |
| 5,358,429 A * | 10/1994 | Mina | 439/695 |
| 5,508,475 A | 4/1996 | Profiri et al. | |
| 5,762,520 A * | 6/1998 | Martin | 439/470 |
| 5,895,291 A * | 4/1999 | Furio et al. | 439/607.41 |
| 5,908,327 A * | 6/1999 | Tsuji et al. | 439/470 |
| 6,339,193 B1 * | 1/2002 | Goett et al. | 174/78 |
| 6,583,357 B2 * | 6/2003 | Rubenstein et al. | 174/360 |
| 6,700,065 B2 | 3/2004 | Karlsson | |
| 7,429,187 B1 | 9/2008 | Gurak | |
| 7,534,965 B1 * | 5/2009 | Thompson | 174/153 G |
| 2004/0121650 A1 | 6/2004 | Lazaro, Jr. | |
| 2009/0032282 A1 | 2/2009 | Sedor et al. | |

* cited by examiner

*Primary Examiner* — Hung S Bui
*Assistant Examiner* — James Wu
(74) *Attorney, Agent, or Firm* — Ingrassia Fisher & Lorenz P.C.

(57) ABSTRACT

An apparatus for dual acting strain relief is provided. In one embodiment, a strain relief apparatus comprises: a main body having a base member including a first surface and a second surface, and a cone member extending from the first surface of the base member, the cone member including an orifice that penetrates through the main body to the second surface; a primary clamp that secures to the main body and shaped to interface with the base member to form a first set of clamping surfaces where the orifice penetrates the second surface; and a secondary clamp having a tapered cavity therein that penetrates through the secondary clamp and is shaped to receive the cone member. A surface of the tapered cavity and a surface of the cone member form a second set of clamping surfaces. The second set of clamping surfaces provide an electrical path to the chassis.

13 Claims, 10 Drawing Sheets

DUAL ACTING STRAIN RELIEF APPARATUS

BACKGROUND

Strain relief mechanisms for electrical cable harnesses are typically bulky in size. Further, they typically utilize compression clamps that squeeze cable shields, grounds and electrical conductors together, creating opportunities for abrasions in conductor insulation that lead to component shorts and grounds.

For the reasons stated above and for other reasons stated below which will become apparent to those skilled in the art upon reading and understanding the specification, there is a need in the art for improved systems and methods for strain relief.

SUMMARY

The Embodiments of the present invention provide methods and systems for dual acting strain relief and will be understood by reading and studying the following specification.

An apparatus for dual acting strain relief is provided. In one embodiment, a strain relief apparatus comprises: a main body having a base member including a first surface and a second surface, and a cone member extending from the first surface of the base member, the cone member including an orifice that penetrates through the main body to the second surface; a primary clamp that secures to the main body and shaped to interface with the base member to form a first set of clamping surfaces where the orifice penetrates the second surface; and a secondary clamp having a tapered cavity therein that penetrates through the secondary clamp and is shaped to receive the cone member. A surface of the tapered cavity and a surface of the cone member form a second set of clamping surfaces. The second set of clamping surfaces provide an electrical path to the chassis.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present invention provide a design for providing strain relief to a cable harness that contains the needle-like wire ends of the cable's braided sleeve so that they can not find a way to short the electrical wires of the cable harness. In one embodiment, this is accomplished through separate partitions for the braided sleeve and the electrical wires, each providing independent strain relief within each partition. Further embodiments of the present invention provide for electrical continuity between the braided sleeve and a chassis ground. Applications for utilizing embodiments of the present invention include any application that utilizes a "pigtail" style electrical harness and may be used for applications such as, but not limited to, power and/or signals cables.

Figure 1A:
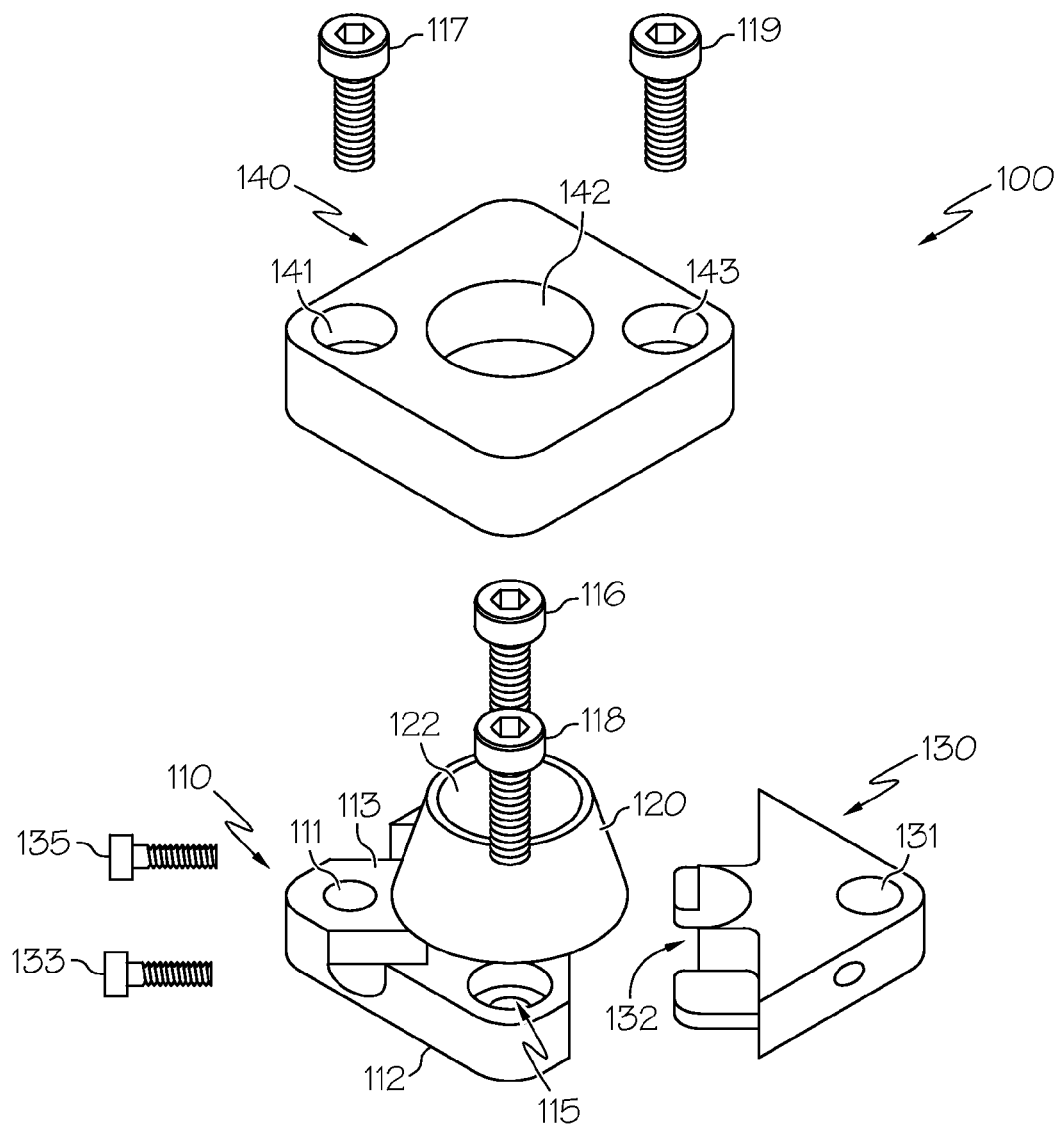
FIGS. 1A and 1B illustrate a dual acting strain relief apparatus 100 of one embodiment of the present invention.
Figure 1B:
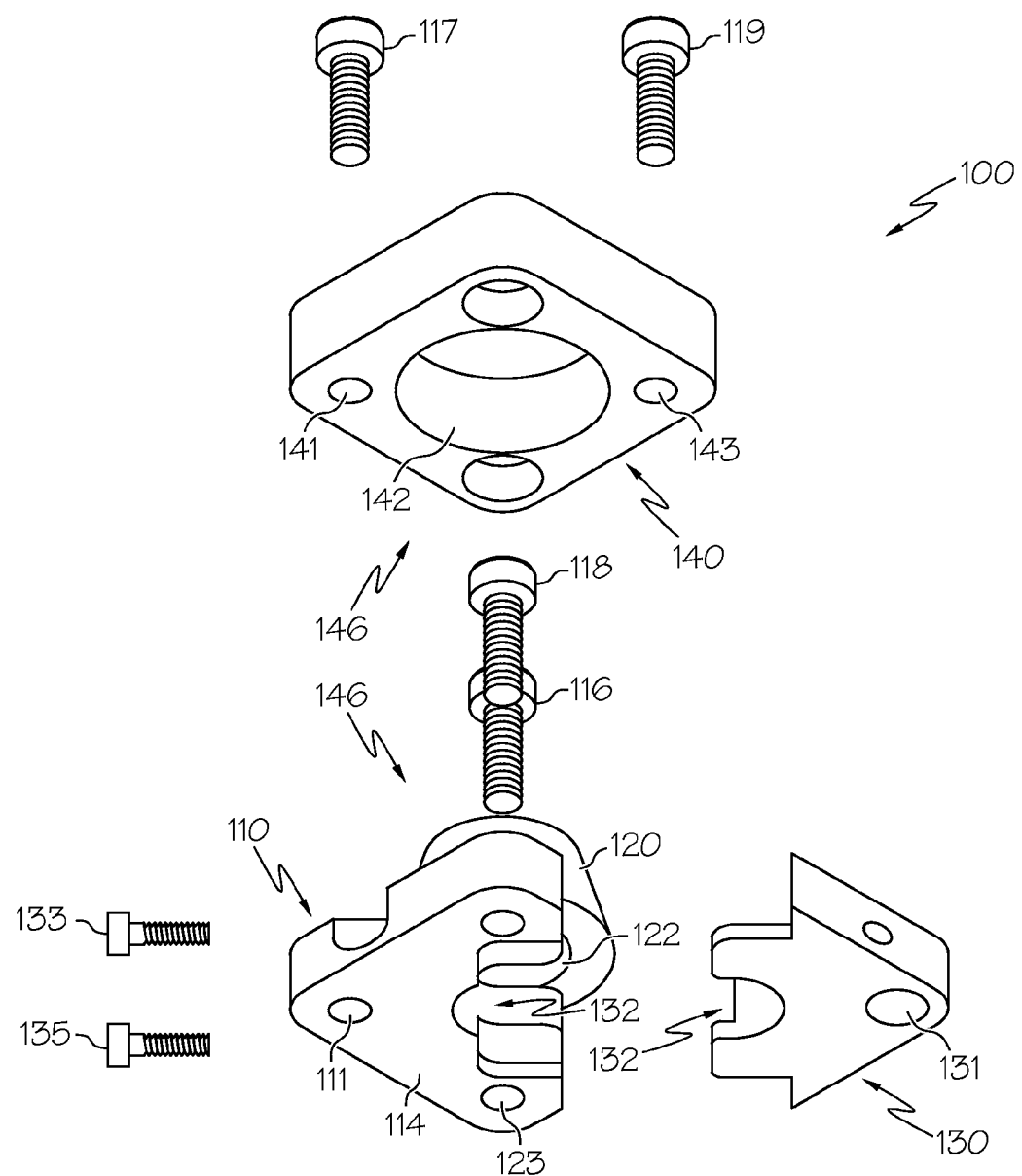

FIGS. 1A and 1B illustrate a dual acting strain relief apparatus 100 of one embodiment of the present invention. Strain relief apparatus 100 comprises a main body 110 having a base member 112 that includes a first surface 113 and a second surface 114, and at least one fastener (shown as threaded fasters 116 and 118) for providing electrical and mechanical coupling of the second surface 114 to a housing. The main body 110 further comprises a cone member 120 protruding from the first surface 113 of the base member 112. The cone member 120 includes a thru-hole that forms an orifice 122 that penetrates through cone member 120 and base member 112 to the second surface 114. Strain relief apparatus 100 further comprises a primary clamp 130 shaped to interface with the base member 112 to form a first set of clamping surfaces 132 with the main body 110 where the orifice 122 penetrates the second surface 114. Strain relief apparatus 100 further comprises a secondary clamp 140 that secures to the main body 110 and the primary clamp 130. The secondary clamp 140 includes a tapered cavity 142 therein that penetrates through the secondary clamp 140. The surfaces of tapered cavity 142 and cone member 120 form approximately parallel surfaces so that tapered cavity 142 receives the cone member 120. The surface of the tapered cavity 142 and the exterior surface of the cone member 120 form a second set of clamping surfaces 146.

Figure 1C:
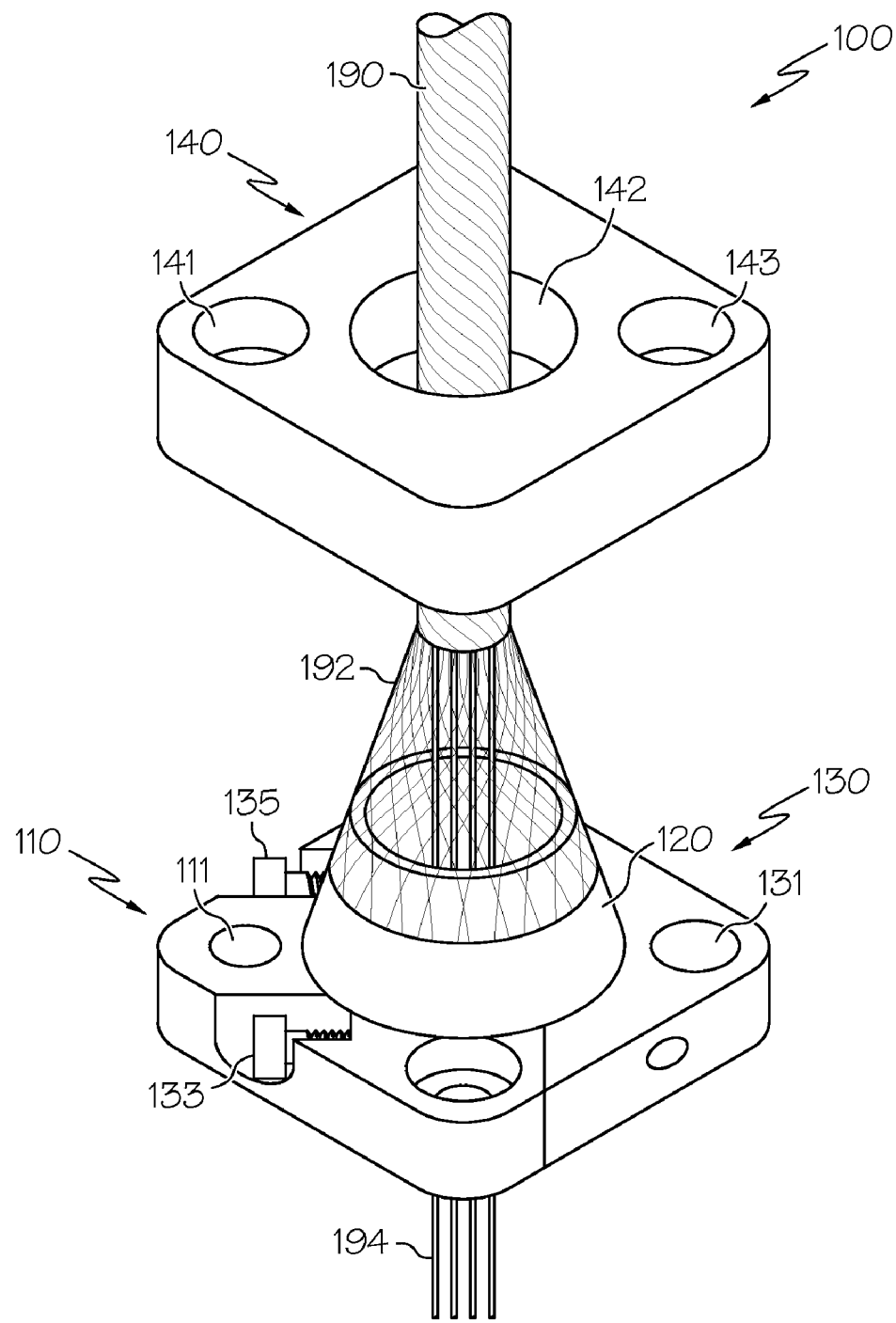
FIGS. 1C and 1D illustrate views of dual acting strain relief apparatus with a cable installed according to one embodiment of the present invention.
Figure 1D:
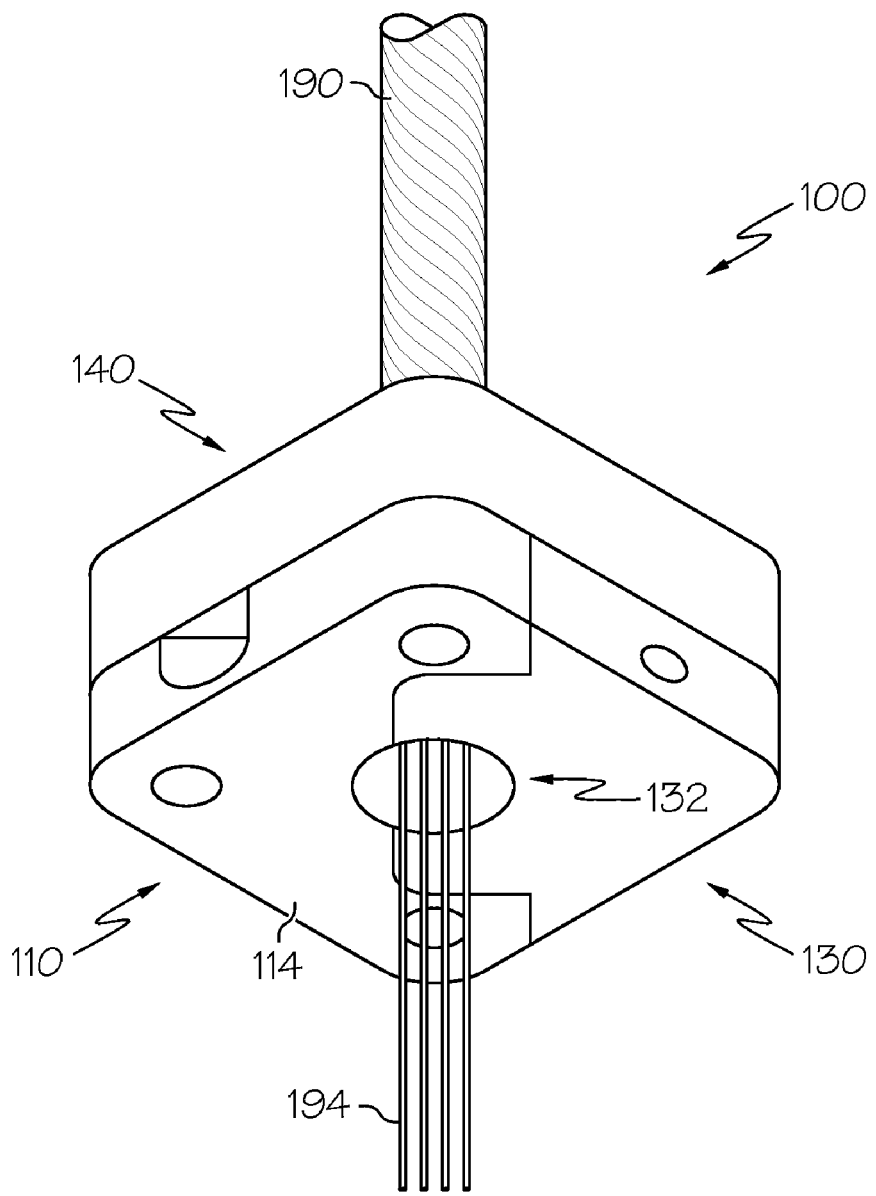
Figure 1E:
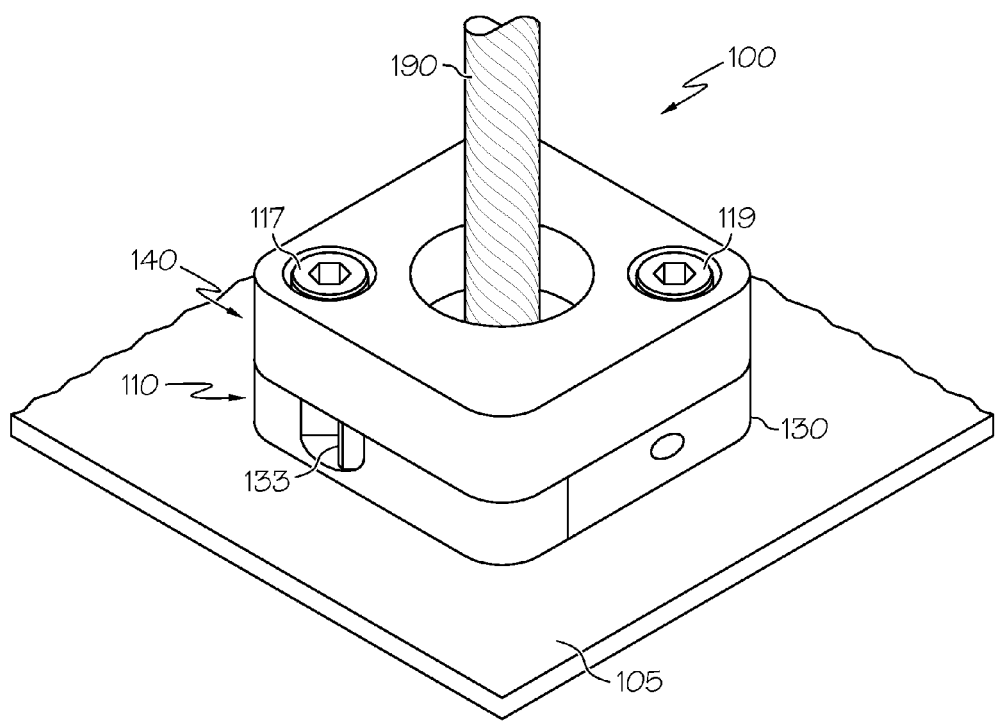
FIG. 1E illustrates a dual acting strain relief apparatus of one embodiment of the present invention mounted to a chassis.
Figure 2A:
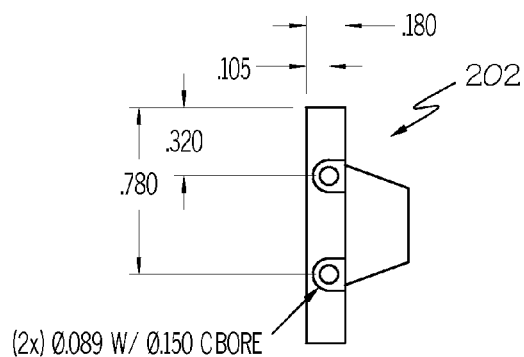
FIGS. 2A-2F are illustrations providing alternate views of a main body for one embodiment of the present invention.
Figure 2B:
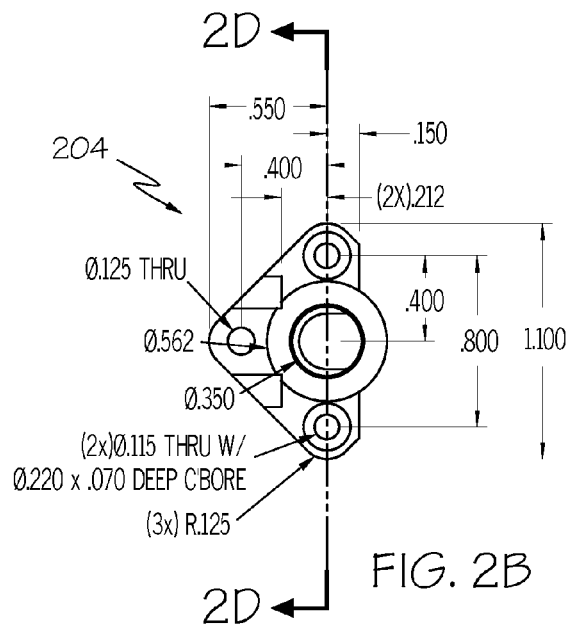
Figure 2C:
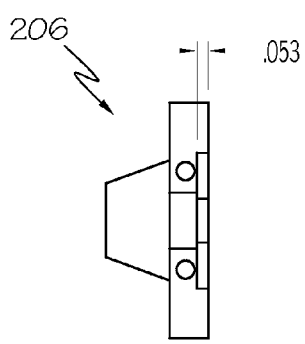
Figure 2D:
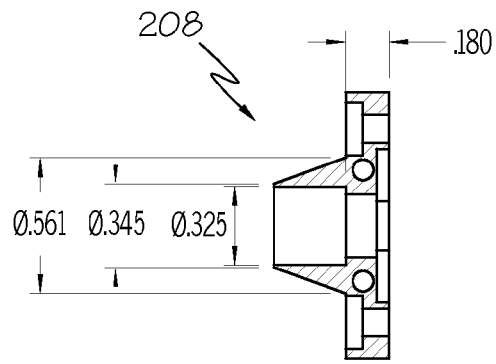
Figure 2E:
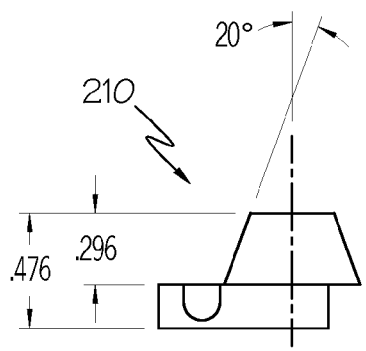
Figure 2F:
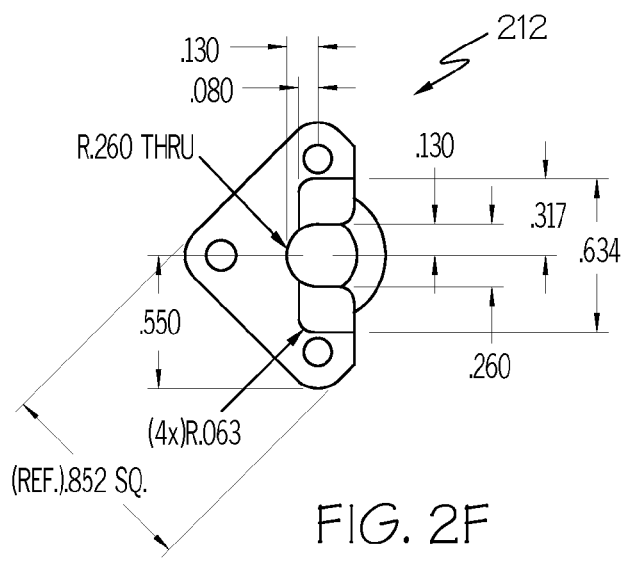

FIGS. 1C and 1D illustrate views of dual acting strain relief apparatus 100 with a cable 190 installed according to one embodiment of the present invention. The main body 110 is secured to a chassis 105 as shown in FIG. 1E with threaded fasteners 116 and 118 inserted into thru-holes 123 and 115 in the main body 110 and threaded directly into the chassis 105. The primary clamp 130 and secondary clamp 140 are independent from each other, but each work in conjunction with the main body 110.

The insulated wires 194 and metallic sleeve 192 of cable 190 go through the secondary clamp 140 via the orifice created by cavity 142. In at least one embodiment, metallic sleeve 192 comprises a metallic braid of wires. The metallic sleeve 192 is separated from cable 190 and pulled over the exterior of cone 120 rather than entering orifice 122. Secondary clamp 140 is secured onto the main body 110, creating the second set of clamping surfaces 146. Tighten the secondary clamp threaded fasteners 117 and 119 down onto main body 110 applies the force that clamps the braid of metallic sleeve 192 between the cone 120 and the inner cavity 142's walls of the secondary clamp 140. The set of clamping surfaces 146 formed by securing secondary clamp 140 onto main body 110 provides a full-360, full-surface clamping of the sleeve 192 around cone 120. The cone 120 establishes a barrier that separates and isolates the wires forming the sleeve 192 from the electrical wires 194 passing through apparatus 100 into the chassis 105. The secondary clamp 140 further provides an electrical connection between the metallic sleeve 192 of cable 190 and the chassis 105. In one embodiment, secondary clamp 140 is secured on main body 110 and further secured to chassis 105 by threaded fasteners 117 and 119 through thru-holes 141 and 143, respectively. In one embodiment, the threads of fastener 117 pass through thru-hole 141 and hole 111 of main body 110 and thread directly into chassis 105. Similarly, the threads of fastener 119 pass through hole 143 and slotted thru-hole 131 of primary clamp 130 and thread directly into chassis 105. Thus, all, in this embodiment, all four of the threaded fasters 116, 117, 118 and 119 are secured in threads in the chassis 105 itself.

The primary clamp 130 receives only the electrical wires 194 fed through orifice 122 of the cone 120. In alternate embodiments, cable 190 may include a plurality of wires, or a single wire. In one embodiment, the wires 194 are 20 to 24 gauged wires. The set of clamping surfaces 132 is formed by securing primary clamp 130 into the base 112 of main body 110. A set of threaded fasteners 133 and 135 are inserted through base 112 to engage primary clamp 130. Tightening fasteners 133 and 135 will pull primary clamp 130 into base 112 such that the set of clamping surfaces 132 will clamp down to hold on the electrical wires 194 of cable 190. Having thru-hole 131 slotted allows sufficient play in the movement of primary clamp 130 to tightening the set of clamping surfaces 132 around electrical wires 194 without interference from tightening fastener 119.

In one embodiment, main body 110, primary clamp 130 and secondary clamp 140 are all manufactured from an aluminum alloy. In one embodiment, fasteners 116-119 and 133, 135 are stainless steel. In one embodiment, strain relief apparatus 100 contains no aluminum threaded components except threads in primary clamp 130 that receive fasteners 133 and 135.

Figure 3A:
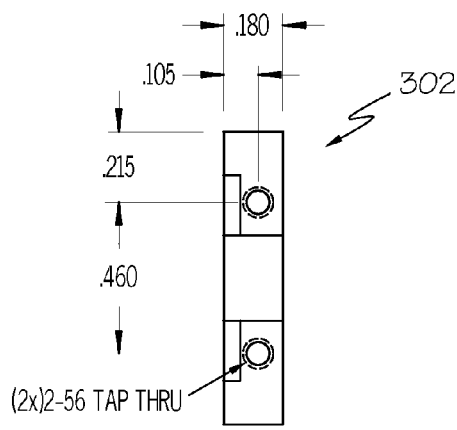
FIGS. 3A-3C are illustrations providing alternate views of a primary clamp for one embodiment of the present invention.
Figure 3B:
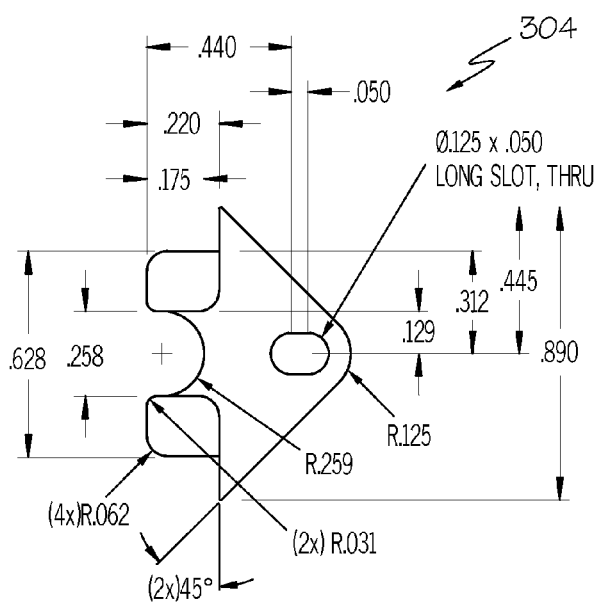
Figure 3C:
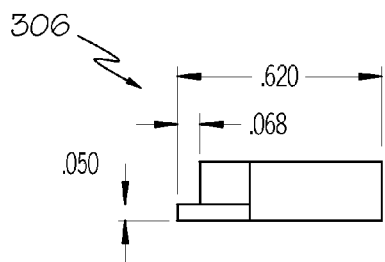
Figure 4A:
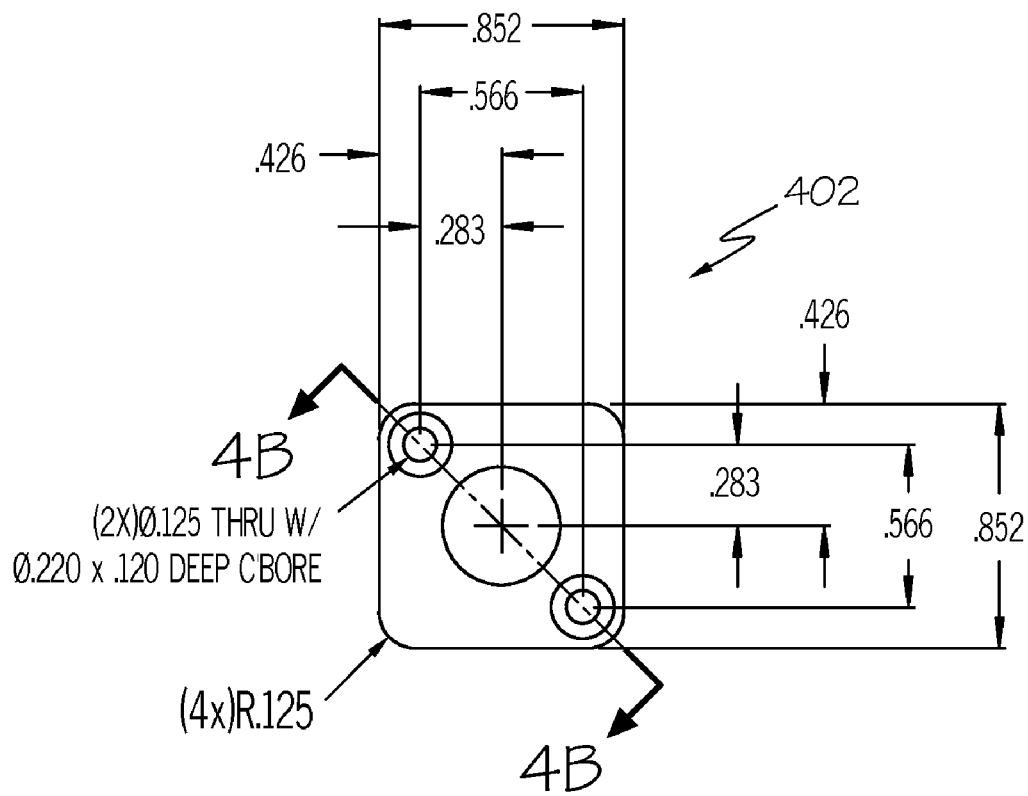
FIGS. 4A-4E are illustrations providing alternate views of a secondary clamp for one embodiment of the present invention.
Figure 4B:
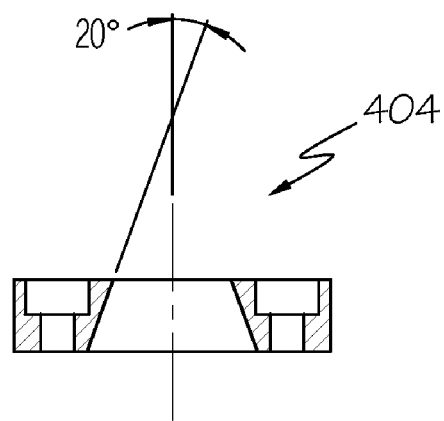
Figure 4C:
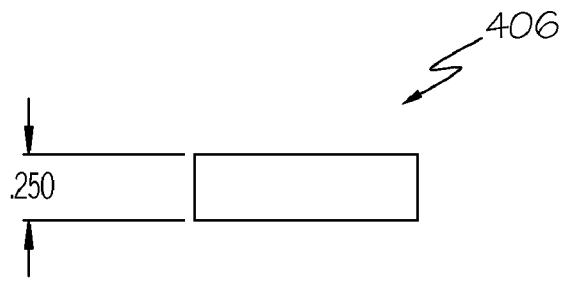
Figure 4D:
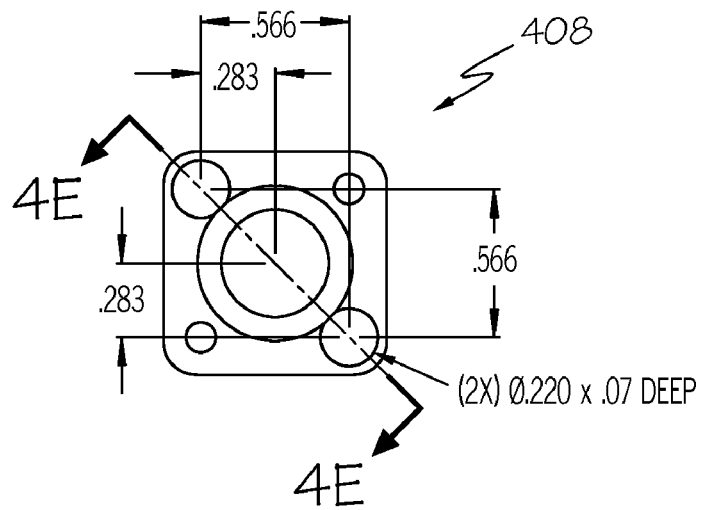
Figure 4E:
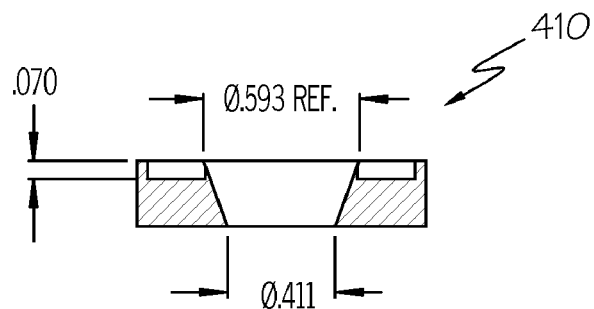

FIGS. 2A-2F are illustrations providing alternate views 202 to 212, each with dimensions of a main body 110 for one embodiment of the present invention. FIGS. 3A-3C are illustrations providing alternate views 302 to 306, each with dimensions of a primary clamp 130 for one embodiment of the present invention. FIGS. 4A-4E are illustrations providing alternate views 402 to 410, each with dimensions of a secondary clamp 140 for one embodiment of the present invention. Dimensions in FIGS. 2-4 are provided in inches.

In one embodiment, in operation of strain relief apparatus 100, an outside sheath of a cable 190 is cut away to reveal a metallic sleeve 192 and one or more wire conductors 194 that form a wire pigtail. The cable 190 inserted through the cavity 142 of the secondary clamp 140. The braiding of the metallic sleeve 192 is spread over the cone shaped member 120 of the main body 110, while the one or more wire conductors 194 are inserted through the orifice 122 of cone shaped member 120. The clamping mechanism formed by cone shaped member 120 and the complementary shaped cavity 142 captures and contains the metallic sleeve 192. The one or more wire conductors 194 that pass through the orifice 122 are secured by the clamping mechanism 132 formed by clamping primary clamp 130 to the base 112. From there, the one or more wire conductors 194 are secured as they continue onto one or more electronic components housed within chassis 105. The cone shaped member 120 thus provides a mechanical barrier that isolates the needle like wire components of the metallic sleeve 192 from the one or more wire conductors 194. This protects the conductors 194 from mechanical abrasions (and eventual shorts) that could be cause by contact with the terminated end of the metallic sleeve 192. A plurality of fasteners 116-119 and 133, 135 mechanically secure the first clamping mechanism 146 and the second clamping mechanism 132 together and to the chassis 105. Further, the first clamping mechanism 146 electrically couples the metallic sleeve 192 to the chassis 105.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A strain relief apparatus, the apparatus comprising:
    a main body having
        a base member that includes a first surface and a second surface, and
        a cone member extending from the first surface of the base member, the cone member including an orifice that penetrates through the main body to the second surface;
    a primary clamp that secures to the main body and shaped to interface with the base member to form a first set of clamping surfaces where the orifice penetrates the second surface; and
    a secondary clamp, the secondary clamp having a tapered cavity therein that penetrates through the secondary clamp and is shaped to receive the cone member, wherein a first fastener that secures the secondary clamp to a chassis via a thru-hole in the main body and a second fastener that secures the secondary clamp to the chassis via a thru-hole in the primary clamp, and wherein a surface of the tapered cavity and a surface of the cone member form a second set of clamping surfaces;
    wherein the second set of clamping surfaces provide an electrical path to the chassis.

2. The apparatus of claim 1, wherein the surface of the tapered cavity and the surface of the cone member are approximately parallel surfaces.

3. The apparatus of claim 1, wherein the base member includes at least one fastener that secures the base member to the chassis.

4. The apparatus of claim 3, wherein the at least one fastener further provides an electrical coupling of the main body to the chassis.

5. The apparatus of claim 1, wherein the thru-hole in the primary clamp is a slotted hole aligned to provide a range of motion for tightening the primary clamp to the main body.

6. The apparatus of claim 1, further comprising at least one primary clamp adjustment fastener that penetrates the main body and engages a threaded hold in the primary clamp.

7. The apparatus of claim 6, wherein tightening the at least one primary clamp adjustment fastener tightens the first set of clamping surfaces.

8. An apparatus for providing strain relief for an electrical harness having a metallic sleeve and at least one conductor, the apparatus comprising:
- a main body having a base member that includes a first surface and a second surface, and a cone member formed on the first surface of the base member, the cone member including an orifice that penetrates through the base member to the second surface;
- a primary clamp shaped to capture the at least one conductor at a first set of clamping surfaces formed with the main body where the orifice penetrates the second surface; and
- a secondary clamp that secures to the main body and the primary clamp, the secondary clamp having a tapered cavity therein that penetrates through the secondary clamp and is shaped to receive the cone member, wherein the secondary clamp including a first fastener that secures the secondary clamp to a chassis via a thru-hole in the main body and a second fastener that secures the secondary clamp to the chassis via thru-hole in the primary clamp, and wherein a surface of the tapered cavity and a surface of the cone member form a second set of clamping surfaces;
- wherein the second set of clamping surfaces electrically couples the metallic sleeve to the chassis.

9. The apparatus of claim 8, wherein the metallic sleeve is separated from the electrical harness and pulled over an exterior of the cone member; and
- wherein the at least one conductor passes through the tapered cavity of the secondary clamp and the orifice of the cone member.

10. The apparatus of claim 9, wherein the cone member provides a mechanical barrier that isolates the metallic sleeve from the at least one conductor.

11. The apparatus of claim 8, wherein the thru-hole in the primary clamp is a slotted hole aligned to provide a range of motion for tightening the primary clamp around the at least one conductor.

12. The apparatus of claim 8, wherein the first fastener and the second fastener apply a force that clamps the metallic sleeve between a surface of the tapered cavity and a surface of the cone member.

13. The apparatus of claim 8, further comprising at least one primary clamp adjustment fastener that penetrates the main body and engages a threaded hold in the primary clamp;
- wherein the at least one primary clamp adjustment fastener applies a force that clamps the at least one conductor between the primary clamp and the main body.

* * * * *